Patented Sept. 15, 1936

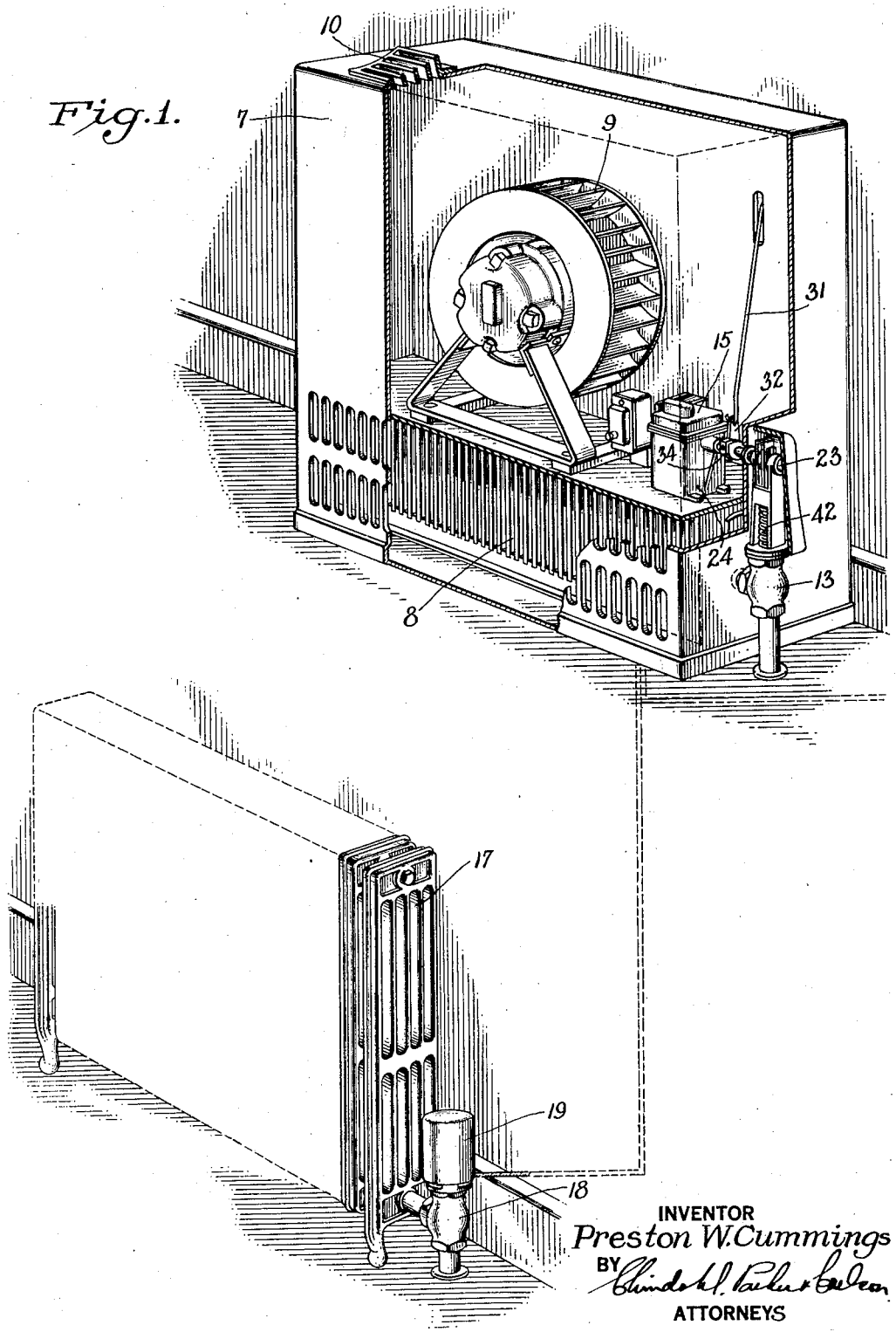

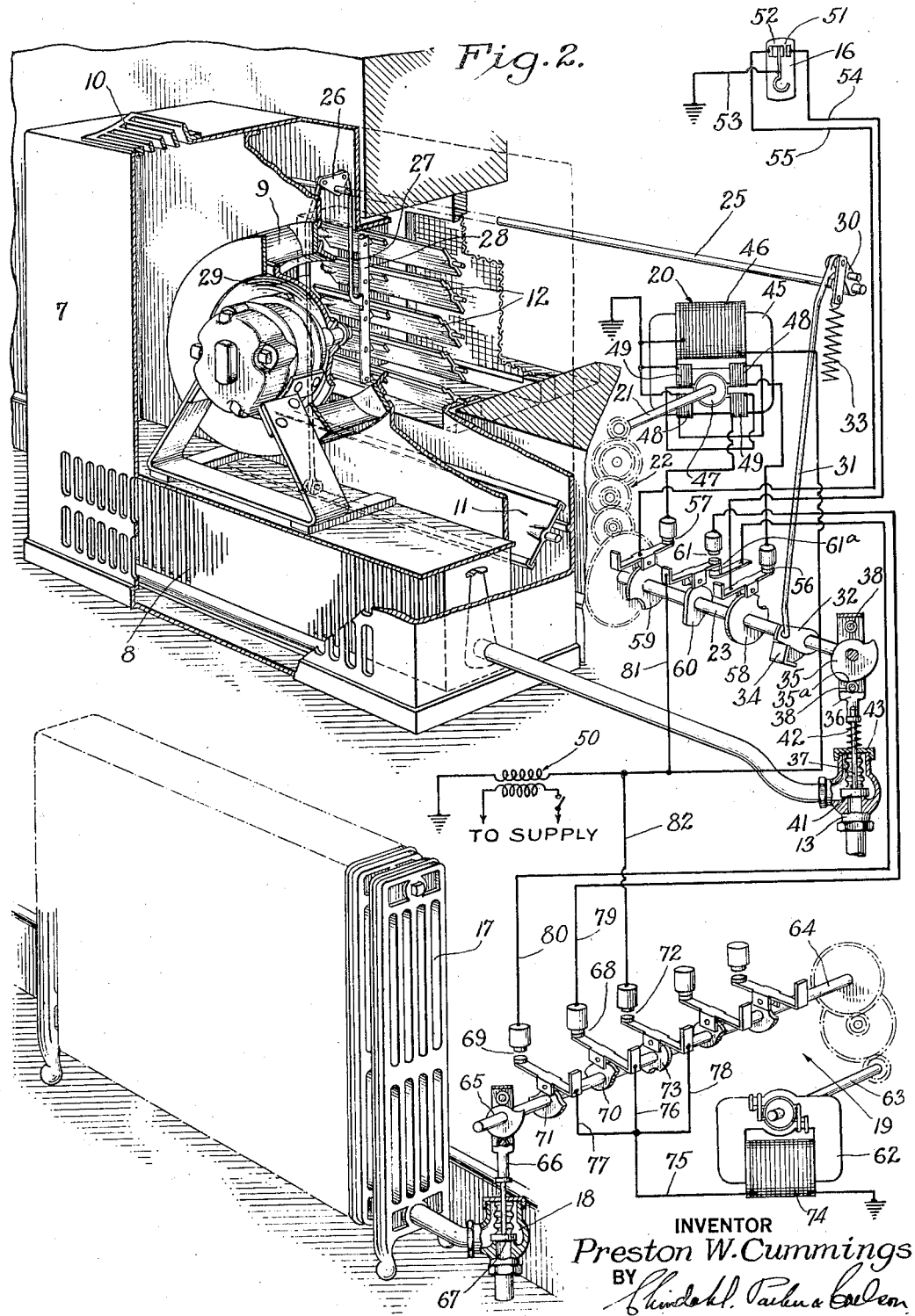

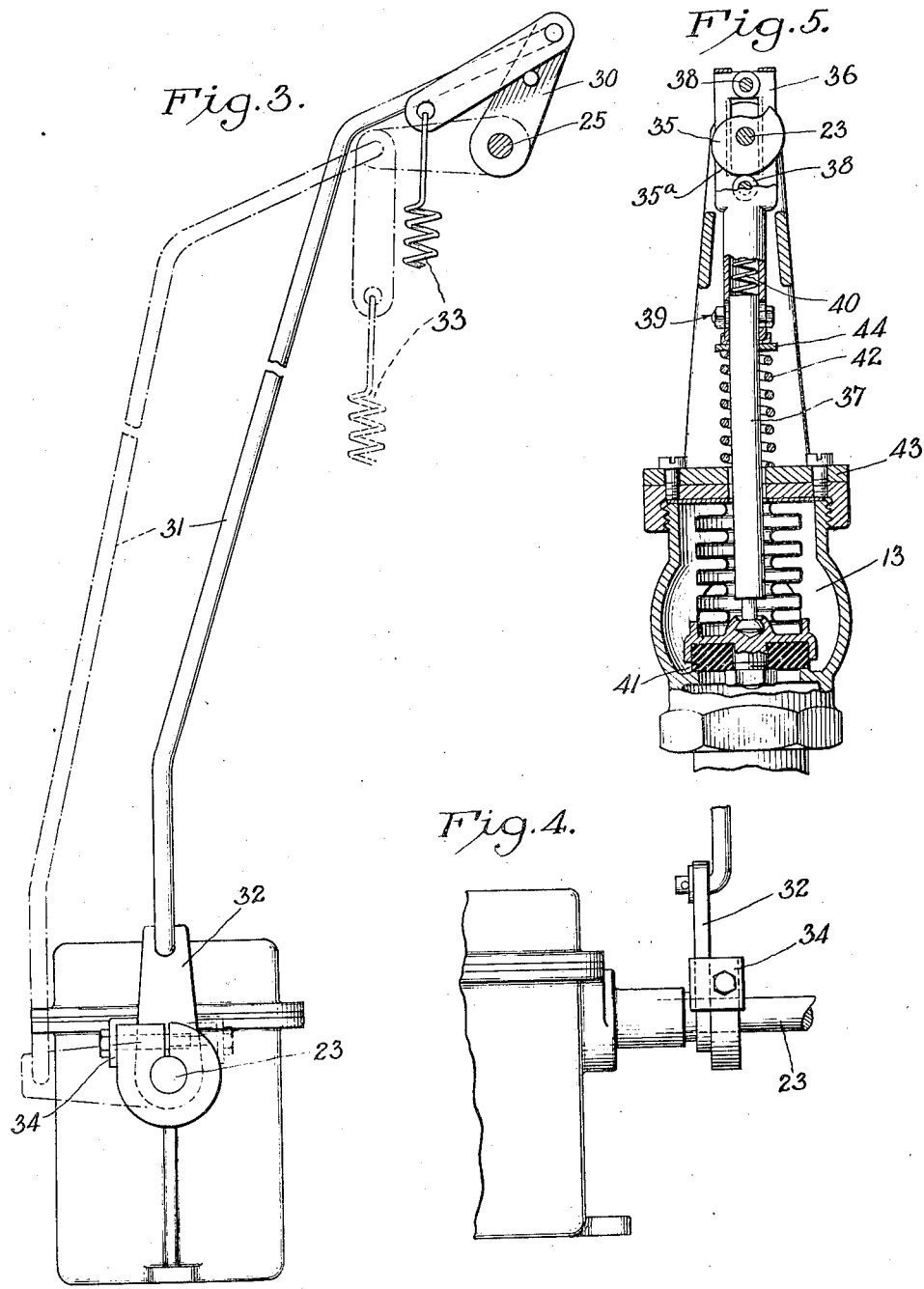

2,054,071

UNITED STATES PATENT OFFICE 2,054,071

TEMPERATURE CONTROL SYSTEM

Preston W. Cummings, Rockford, Ill., assignor to Howard D. Colman, Rockford, Ill.

Application February 3, 1932, Serial No. 590,610

11 Claims. (Cl. 236—38)

The invention relates to a system of temperature regulation involving the operation of a plurality of fluid control devices such as valves and dampers in a predetermined sequence; and the general object of the invention is to provide an effectual operating mechanism for such devices which is capable of being manufactured at a low cost, and is relatively compact.

A further object is to provide for the successive operation of a plurality of fluid control devices in one direction or the other by means of an operating mechanism actuated by a single electrically driven operator.

The invention is especially applicable to temperature regulating systems of the type which includes a damper for regulating the supply of air to a room, and valve means for controlling the supply of a heating medium such as steam to a heater unit for the purpose of modifying the temperature of the air thus supplied; and a further object is to provide for a graduated and accurate control of the room temperature through the medium of an effectual operating mechanism actuated by a single shaft which is driven in opposite directions selectively by electric motor means under the control of a thermostat, in a manner such as to actuate the damper and the valve successively, but in different orders depending on the direction of rotation of the motor.

Still another object of the invention is to provide in a temperature control apparatus having regulating devices including an air damper and a valve for controlling the supply of a heating medium, thermostatically controlled electric motor means advantageously associated with said devices so as to govern the direction and extent of movement thereof in response to varying temperature conditions.

In the accompanying drawings, Figure 1 is a fragmentary perspective view of a unit ventilator having my improved control mechanism embodied therein and showing in addition a separate heating unit in the form of a radiator to which heat is supplied under the control of a power driven operator, whose operation is initiated by the main control mechanism for the unit ventilator.

Fig. 2 is a somewhat similar view but showing the construction of the unit ventilator more in detail and including a full schematic illustration of the control system as applied to the operation of two dampers and two steam supply valves.

Figs. 3 and 4 are fragmentary detail views illustrating the damper operating mechanism.

Fig. 5 is a fragmentary vertical sectional view illustrating the construction of the steam supply valve for the unit ventilator and the manner of applying the power-driven operator thereto.

In such illustrative embodiment of the invention, 7 designates the casing of a unit ventilator having in the lower portion thereof a heater unit 8. Arranged above this unit is a fan 9 for drawing air through the lower portion of the casing and discharging it upwardly through an outlet 10. The air thus forced through the casing 7 is admitted from the interior of the room under the control of a damper 11, and from the exterior of the room under the control of a set of dampers 12. For convenience hereinafter, the dampers 11 and 12 are respectively referred to as the recirculating and fresh air dampers. The unit ventilator construction is such that the air passing through the casing under the control of the recirculating damper 11 must first pass through the heater unit 8 to which steam or other heating medium is supplied under the control of a valve 13.

The dampers 11 and 12 and the valve 13 are all controlled, according to the present invention, by means of a single electrically driven operator 15 (Fig. 1) under the control of a room thermostat 16 (Fig. 2) and in some instances an auxiliary source of heat is provided as by means of a radiator 17. As herein shown, this radiator is equipped with a control valve 18 which is opened or closed by an operator 19 under the control of the main operator 15.

In the present instance, the dampers 11 and 12 are interconnected for operation in opposite directions so that when the recirculating damper 11 is closed, the fresh air dampers 12 are opened, and vice versa; and the valve 13 is so related to the operator as to be opened when the recirculating damper is in wide open position and the fresh air dampers closed, and vice versa. As a result, steam is supplied to the heater unit 8 only after the supply of fresh air is entirely cut off. The radiator 17 is supplied with heat by the opening of the valve 18 only in case the heater unit 8 is unable to raise the temperature to the predetermined point.

Referring now to the means which I have provided for thus operating the dampers 11 and 12 and the valve 13, the main operator 15 comprises a reversible electric motor 20 (Fig. 2) preferably in the form of a core type shading ring induction motor having a drive shaft 21 connected through a suitable gear train 22 with a main operating shaft 23. Said motor and gear train are suitably enclosed within a casing 24 (Fig. 1) which may be conveniently mounted within one end of the casing 7 of the unit ventilator, with the main operating shaft extended outwardly from the casing in overlying relation to the valve 13.

Rotation of the shaft 23 in either direction causes the dampers 11 and 12 to be operated. The means employed for this purpose comprises a rock shaft 25 (Fig. 2) having suitable bearings in the upper portion of the casing 7 and operatively connected with the main operating shaft 23. Within the casing is a bell crank 26 fast on the shaft in overlying relation to the fresh air dampers 12 and having one arm connected by means of a link 27 to an operating bar 28 pivotally connecting the several dampers. The other end of this bell crank is connected by a link 29 to the recirculating damper 11 so that in the rotation of the shaft 25 in one direction or the other, the dampers 11 and 12 operate reversely.

The shaft 25 is rocked in the rotation of the shaft 23 in a direction determined by the direction of rotation of the motor 20, and to this end the operative connection employed comprises a crank arm 30 fast on the shaft 25 and connected by a link 31 to an arm 32 loose on the shaft 23. A spring 33 connected with the crank arm 30 tends to impart a limited rotational movement to the shaft 25 counter-clockwise; that is to say, in a direction to close the fresh air dampers 12 and open the recirculating damper 11. Movement of the shaft 25 in the opposite direction is effected by means of a stop member 34 fast on the shaft 23 and adapted to engage with the loose arm 32 at a predetermined point in the rotation of the shaft 23 in a clockwise direction. The point at which movement of the shaft 25 occurs to close the recirculating damper and open the fresh air dampers is such as to permit the advance operation of the valve 13 into closed position; and, on the other hand, movement of the shaft 25 by the spring 33 in a direction to open the recirculating damper and close the fresh air dampers occurs in the rotation of the shaft 23 in advance of the operation of the valve 13 into open position.

In the present instance, the valve 13 is actuated positively by means of a cam 35 fast on the main operating shaft 23 and a slotted follower 36 connected with a valve stem 37 (Fig. 5). The cam is of the open face type and acts upon oppositely disposed follower rollers 38, the follower having a pin-and-slot connection 39 with the valve stem. A stiff spring 40 enclosed within a tubular portion of the follower is adapted to be compressed to hold the valve member 41 against its seat with a yielding pressure, and another spring 42, interposed between the bonnet 43 of the valve and a washer 44 at the lower end of the follower, serves to hold the lower follower roller 38 in contact with the cam. The spring 40 employed in the motion-transmitting connection between the follower and the valve is of course, made of such strength or stiffness that the movements imparted to the valve member are positive in effect. The lobe of the cam 35, it will be observed, has a dwell surface 35ª effective to hold the valve member 41 against its seat while the shaft 23 is rotating through approximately one quarter of a revolution to actuate the dampers 11 and 12, thus providing in effect a lost motion connection between the shaft and the valve during which the dampers are operated.

When the parts are in the relation shown in broken lines in Fig. 3, the dampers 11 and 12 are held in open and closed positions respectively by the spring 33 acting upon the rock shaft 25. Assuming that at the same time the shaft 23 is in a position such as to hold the valve 13 open, it will be seen that if the shaft 23 is rotated in a clockwise direction (Fig. 3), it will cause the valve member 41 to be lowered against its seat (Fig. 5), and during this movement, the stop member 34 on the shaft 23 will move toward the loose arm 32. Then, as the valve member reaches its closed position, the stop member will move into engagement with the loose arm 32. In the continued rotation of the shaft, the arm 32 is swung upwardly against the action of the spring 33 so as to rock the shaft 25 and close the damper 11 and open the dampers 12, the position of the parts at the end of such operation being shown in full lines in Fig. 3.

In the reverse operation, the dampers 11 and 12 will, of course, be operated first into open and closed positions respectively, and thereafter the valve member 41 will be caused to move into open position. Thus, it will be seen that when the supply of fresh air is entirely cut off and recirculating air only is being drawn through the apparatus, steam is supplied to the heater unit 8; and that when the recirculating damper has been closed and the fresh air dampers opened, the supply of steam to the heater unit is cut off by reason of the closure of the valve 13 in advance of such operation of the dampers.

The motor 20 of the power unit 15 comprises briefly a stator 45 enclosed by a main winding 46 and defining two poles on opposite sides of a squirrel cage rotor 47. Shifting of the magnetic field around the rotor when the winding 46 is excited is produced by the well known action of shading coils. These, in the present instance, are arranged in pairs 48 and 49 with the coils of each pair disposed on diametrically opposite sides of the rotor and connected in series relation. When the main winding 46 is excited from a source 50 of alternating current, the rotor will revolve in one direction when the shading coils 48 are short circuited, and in the opposite direction when the coils 49 are short circuited.

Selective short-circuiting of the shading coils 48 and 49 is effected under the control of the thermostat 16 which has two switches 51 and 52 with a common terminal connected by a conductor 53 to ground. The insulated switch terminals of the thermostat are spaced apart so that both switches may be opened and thus both sets of shading coils rendered ineffectual simultaneously. These terminals are connected respectively to the coils 48 and 49 by conductors 54 and 55, and interposed in said conductors respectively are two switches 56 and 57 controlled by two notched disks 58 and 59 fast on the main operating shaft 23. The switches 56 and 57 constitute limit switches for determining the extent of operation in either direction.

Closure of the thermostat switch 52 in response to a rise in temperature above the predetermined point, renders the shading coils 49 effective to cause rotation of the shaft 23 in a clockwise direction; and closure of the thermostat switch 51, in response to a drop in temperature below the predetermined point, renders the shading coils 48 effective to cause rotation of the shaft 23 in a counterclockwise direction. Thus the direction of movement of the dampers 11 and 12 and valve 13 is determined by the selective closure of the thermostat switches according to temperature conditions. However, the rate of movement of such devices in either direction is slow and therefore subject to interruption by movement of the thermostat tongue into neutral position. As a result of this arrangement, the regulating devices operate under the control of the thermostat to correct any excess or deficiency in heat supply, and tend to assume positions such as to maintain the set temperature through a proper throttling action of the dampers and valve, it being observed that the valve member 41 is at all times under the control of its actuating cam 35 so as to be positively held against steam pressure in various throttling positions.

In cases where the separate radiator 17 is employed, the valve 18 is actuated by its operator 19 under the control of the main operator 15. To this end, the main operating shaft 23 has a cam 60 thereon adapted to control two switches 61 and 61a having a common terminal and governing the operation of the auxiliary operator 19.

Said auxiliary operator 19 comprises a motor 62 of the same general character as the motor 20 but non-reversible. Its shaft 63 is connected by a suitable gear train with a shaft 64 having fast thereon a cam 65 which acts through a follower 66 to operate the reciprocable valve member 67 of the valve 18. Successive opening and closing cycles are initiated by two starting switches 68 and 69, respectively, controlled by cams 70 and 71 on the shaft 64, and upon the initiation of either cycle, a switch 72 controlled by a notched disk 73 maintains the circuit to the motor closed until the end of the cycle, thereupon interrupting the same. The main winding 74 of the motor is connected by a conductor 75 and branch conductors 76, 77 and 78 to the movable terminals of the switches 68, 69 and 72 respectively. The stationary terminals of the switches 68 and 69 are respectively connected by conductors 79 and 80 to the stationary terminals of the switches 61 and 61a respectively, while the common movable terminal of said switches is connected to the current source by a conductor 81. The stationary terminal of the switch 72 is also connected directly to the source of current by a conductor 82. The arrangement is such that when the valve 13 is in wide open position and the room thermostat 16 continues to call for heat, the motor 62 is started under the control of switches 61 and 68 to open the valve 18. On the other hand, when the room thermostat ceases to call for heat, the motor is started under the control of switches 61a and 69 to cause the operator 19 to close the valve 18.

It is to be observed that by employing separate dampers 11 and 12 only a short angular movement of the actuating shaft is required to move such dampers through their entire ranges of movement. During such movement of the shaft the dwell surface on the valve actuating cam 35 holds the valve 13 in closed position, and the valve is actuated from open to closed position during the relatively large remaining portion of the angular movement of the shaft.

I claim as my invention:

1. In an apparatus of the character described, the combination of a heater unit having a control valve, a damper for controlling the flow of air relative to said unit, a thermostat, and a single electrically driven operator controlled by said thermostat and including a reversely rotatable main operating shaft, and separate means, each driven directly by said shaft and respectively operable on said valve and damper while the shaft is rotating in either direction, said means being arranged to actuate said valve and damper in a predetermined order.

2. A temperature regulating apparatus comprising a damper for controlling the supply of air to a room, means for conditioning the air thus supplied including a fluid control device, a thermostat, an electric motor controlled by said thermostat, a rotary operating shaft adapted to be driven at slow speed by said motor, a cam on said shaft operatively associated with said device, and adapted to impart a slow and graduated movement thereto, and a lost-motion connection between said shaft and said damper.

3. In a temperature regulating apparatus, means for supplying air to a room including a damper, means for conditioning the air thus supplied including a fluid control valve, a thermostat, a rock shaft operatively connected with said damper and biased to rotate in one direction, a main operating shaft having a member loose thereon operatively connected with said rock shaft, an element on said shaft for actuating said member but movable a predetermined distance independently of said member, and means on said shaft for actuating said valve during such independent movement of said member.

4. A temperature regulating apparatus comprising, in combination, damper means for controlling the supply of air to a room, means for conditioning the air thus supplied including a control valve having a valve member to be operated, a power driven operator for said valve including a rotary operating shaft, a reversible electric motor for driving said shaft, means on said shaft operable in the rotation thereof in opposite directions to impart positive opening and closing movements to said valve member, other means operable in the rotation of said shaft to actuate said damper means in a predetermined timed relation to said valve, a thermostat for controlling said motor, and means for limiting the extent of rotation of said shaft by said motor.

5. A temperature regulating apparatus, comprising in combination, damper means for controlling the supply of air to a room, means for conditioning the air thus supplied including a control valve having a valve member to be operated, a power driven operator for said valve member including a shaft, an electric motor for driving said shaft and means on said shaft operable as the shaft is rotated from an initial position in one direction first to move said valve member positively into closed position and then to hold it in closed position, damper operating mechanism including a rock shaft, other means operable by the motor shaft and operatively connected with said rock shaft to actuate it while said valve member is held in closed position, and a thermostat responsive to said air supply for controlling said motor.

6. A temperature regulating apparatus, comprising in combination, damper means for controlling the supply of air to a room, means for conditioning the air thus supplied including a control valve having a valve member to be operated, a power driven operator for said valve including a main rotatable shaft, electric motor means for reversely rotating said shaft, a crank arm on said shaft having a lost-motion connection with said damper means, a spring tending to move the damper means in one direction, means on said main shaft operable during a predetermined rotational movement thereof to move said valve member positively into closed position and then to hold it in closed position, and means operable at a predetermined point in such rotational movement of the main shaft to impart movement to the crank arm thereon and thereby to said rock shaft, a thermostat for controlling the direction of rotation of said motor, and means operating automatically to limit the extent of rotation of said shaft by the motor.

7. A temperature regulating apparatus having an air damper and a heat supply valve, thermostatically controlled electric motor means including a rotary operating shaft, a cam fast on said shaft for positively operating said valve, and an oscillatory element fast on said shaft and having a lost motion connection with said damper to move it.

8. In an apparatus of the character set forth, the combination of damper means for controlling the supply of air to a room, means for conditioning the air thus supplied including a control valve having a valve member to be operated, a power driven operator including a rotatable shaft, thermostatically controlled electric motor means for driving said shaft reversely in opposite directions, means operable in the rotation of said shaft from an initial position in one direction first to move said valve member positively into closed position and then to hold it in closed position, and other means operable in the rotation of said shaft to actuate said damper means while the valve member is held in closed position.

9. In an apparatus of the character set forth, the combination of damper means for controlling the supply of air to a room, means for conditioning the air thus supplied including a control valve having a valve member to be operated, a power driven operator including a rotatable shaft, thermostatically controlled electric motor means for driving said shaft reversely in opposite directions, means operable in the rotation of said shaft from an initial position in one direction first to move said valve member positively into closed position and then to hold it in closed position, and other means operable in the rotation of said shaft to actuate said damper means while the valve member is held in closed position, said valve operating means including a cam adapted to move said valve member into closed position with a slow and graduated movement.

10. A temperature regulating apparatus comprising a heater unit having a control valve, two dampers, one controlling the recirculation of air relative to said unit and the other controlling the admission of fresh air, means connecting said dampers for operation in unison but in reverse directions, and a thermostatically-controlled electrically-driven operator including a rotary operating shaft having two actuating elements thereon, one operatively associated with said valve and adapted to move it positively into closed position and the other connected with said two dampers, said elements being arranged to operate the valve and dampers in a predetermined order.

11. In a temperature regulating apparatus having an air damper and a heat supply valve, the combination of a thermostatically controlled electric motor driven operator including an oscillatory operating shaft, a cam follower connected to said valve, a cam fast on said shaft and having a surface thereon for positively actuating said follower and thereby moving said valve, a dwell surface arranged to engage said follower in the further movement of said shaft and maintain the position of said valve, and means on said shaft having an operative connection with said damper for actuating the damper in the oscillatory movement of said shaft during engagement of said follower and said dwell surface.

PRESTON W. CUMMINGS.